US007191209B1

(12) United States Patent
Kirkpatrick et al.

(10) Patent No.: US 7,191,209 B1
(45) Date of Patent: Mar. 13, 2007

(54) APPLICATION SERVER AND METHOD TO PERFORM HIERARCHICAL CONFIGURABLE DATA MANIPULATION

(75) Inventors: Mark A. Kirkpatrick, Conyers, GA (US); John A. Strohmeyer, Norcross, GA (US); Darin J. Morrow, Acworth, GA (US); Michael S. Bass, Lawrenceville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 577 days.

(21) Appl. No.: 09/916,288

(22) Filed: Jul. 30, 2001

(51) Int. Cl.
*G06F 15/16* (2006.01)

(52) U.S. Cl. .................... 709/203; 709/246

(58) Field of Classification Search ............. 709/230, 709/201, 229, 202, 219–228, 232, 246, 249, 709/218, 203–207; 707/4, 10, 6, 102, 100, 707/1, 200, 101, 7; 705/9; 719/332, 316; 379/201.12; 455/414.1

See application file for complete search history.

(56) References Cited

U.S. PATENT DOCUMENTS

| | | | |
|---|---|---|---|
| 5,388,255 A | 2/1995 | Pytlik et al. | |
| 5,732,218 A * | 3/1998 | Bland et al. | 709/224 |
| 5,761,668 A * | 6/1998 | Adamchick | 707/101 |
| 5,813,017 A * | 9/1998 | Morris | 707/204 |
| 5,898,836 A | 4/1999 | Freivald et al. | |
| 5,943,662 A * | 8/1999 | Baba et al. | 706/23 |
| 5,958,010 A * | 9/1999 | Agarwal et al. | 709/224 |
| 5,958,016 A * | 9/1999 | Chang et al. | 709/229 |
| 5,978,842 A | 11/1999 | Noble | |
| 6,038,542 A * | 3/2000 | Ruckdashel | 705/9 |
| 6,044,372 A * | 3/2000 | Rothfus et al. | 707/10 |
| 6,047,280 A * | 4/2000 | Ashby et al. | 707/2 |
| 6,047,323 A | 4/2000 | Krause | |
| 6,078,918 A * | 6/2000 | Allen et al. | 707/6 |
| 6,081,517 A | 6/2000 | Liu | |
| 6,084,877 A | 7/2000 | Egbert et al. | |
| 6,085,030 A * | 7/2000 | Whitehead et al. | 709/203 |
| 6,085,222 A * | 7/2000 | Fujino et al. | 709/202 |
| 6,141,691 A | 10/2000 | Frink | |
| 6,157,634 A | 12/2000 | Mehta | |
| 6,163,776 A * | 12/2000 | Periwal | 707/4 |
| 6,202,096 B1 | 3/2001 | Williams | |
| 6,304,647 B1 * | 10/2001 | Frost | 379/201.12 |
| 6,411,697 B1 * | 6/2002 | Creamer et al. | 379/201.12 |
| 6,453,356 B1 | 9/2002 | Sheard | |
| 6,463,528 B1 | 10/2002 | Rajakarunanayake | |
| 6,476,833 B1 * | 11/2002 | Moshfeghi | 345/854 |
| 6,484,214 B1 * | 11/2002 | Sundermier | 719/332 |
| 6,499,017 B1 * | 12/2002 | Feibelman et al. | 705/8 |
| 6,526,423 B2 * | 2/2003 | Zawadzki et al. | 715/506 |
| 6,546,095 B1 * | 4/2003 | Iverson et al. | 379/201.12 |
| 6,625,274 B1 * | 9/2003 | Hoffpauir et al. | 379/229 |
| 6,665,662 B1 * | 12/2003 | Kirkwood et al. | 707/3 |
| 6,697,824 B1 * | 2/2004 | Bowman-Amuah | 709/229 |
| 6,697,849 B1 * | 2/2004 | Carlson | 709/219 |

(Continued)

*Primary Examiner*—Rupal Dharia
*Assistant Examiner*—Kristie D. Shingles
(74) *Attorney, Agent, or Firm*—Withers & Keys, LLC

(57) ABSTRACT

Clients using standard software protocols may access a manipulation application server for manipulation service on data via a number of methods including Internet applications, a Java RMI server, a CORBA gateway server and graphical screen interphase applications. The manipulation server provides manipulation service on the data based on dynamically maintained, centrally stored manipulation functions.

18 Claims, 2 Drawing Sheets

U.S. PATENT DOCUMENTS

| | | |
|---|---|---|
| 6,718,332 B1 * | 4/2004 | Sitaraman et al. .......... 707/102 |
| 6,751,302 B1 * | 6/2004 | Hoang et al. ............ 379/93.07 |
| 6,757,720 B1 | 6/2004 | Weschler, Jr. |
| 6,782,508 B1 | 8/2004 | Bahrs |
| 6,839,748 B1 * | 1/2005 | Allavarpu et al. .......... 709/223 |
| 6,917,944 B1 | 7/2005 | Prasad et al. |
| 6,941,326 B2 * | 9/2005 | Kadyk et al. ............... 707/202 |
| 6,961,760 B2 | 11/2005 | Li et al. |
| 6,999,570 B2 * | 2/2006 | Alcott ................... 379/207.02 |
| 7,062,452 B1 * | 6/2006 | Lotvin et al. ................. 705/26 |
| 2001/0037361 A1 | 11/2001 | Croy |
| 2003/0046370 A1 * | 3/2003 | Courtney .................... 709/220 |

* cited by examiner

APPLICATION SERVER AND METHOD TO PERFORM HIERARCHICAL CONFIGURABLE DATA MANIPULATION

FIELD OF THE INVENTION

The present invention relates to an application properties server and method to provide software manipulation services for clients. More particularly, the present invention relates to a system and a method for allowing applications software using established computer network protocols to execute hierarchical configurable data manipulation from a centralized database.

BACKGROUND OF THE INVENTION

Computer applications ("application servers") commonly require input data to be manipulated prior to additional processing. The manipulation requirements are often dynamic. For example, manipulation requirements for a telephone service provider's software applications may change based on changed customer service availability, newly available or no longer available customer services, the number of customer requests in a given period, the acceptable times for requests, or the version of the software running.

In today's networked environment, application servers run a variety of different software protocols (e.g., J2EE Containers with CORBA orbs, J2EE Containers with RMI) and typically require a number of different data manipulations before performing other functions. As a result, a need exists for an application server that can dynamically maintain, process and efficiently run manipulations for a plurality of clients running different software protocols simultaneously. A further need exists for solving the common business problem of continually needing to translate, manipulate, or to otherwise conform data that is input by a user or used by an application, prior to further processing or storing of the data, with dynamically maintainable manipulation functions.

Further, because data manipulation requirements often change, a need exists for a manipulation application server that can perform the manipulations run on specific fields of client manipulation requests without requiring extensive changes in software. Most computer software applications use configuration variables to alter its behavior without the need for regenerating code. This is most often done using text files. In today's Internet and networked environments this can cause administrative problems. This is largely because the same software application may be running on several machines, in several locations. Thus, in order to alter uniformly the behavior of all software applications, or clients, all files need to be accessible by the text files. This can cause great expense and significant administration problems. For one thing, security considerations often dictate that a text file employed to alter a software application must be on the same machine that is running the code. Therefore, the configuration file often must be replicated over several machines. If changes are made on one software application, they must also be made on all of the other applications. Errors can occur if the changes are not made consistently on all of the applications. Accordingly, a further need exists for an application server that will allow application server administrators to update the various manipulations done on fields of data without a new release of code.

SUMMARY OF THE INVENTION

The present invention is a system and method wherein application servers using standard software protocols may access a centralized, maintainable, manipulation application server coupled to a data schema for providing manipulation services. The client servers may access the manipulation server via a number of methods including Internet applications, a Java RMI server, a CORBA gateway server and graphical screen interphase applications. The manipulation application server provides manipulation services on the data based on dynamically maintained, centrally stored, manipulation functions, and returns manipulation notifications to, or provides additional services for, the client servers. According to embodiments of the present invention, data is received from user clients, manipulated by an application server via stored, dynamically maintained functions, which are invisible to the user clients, and returned to the user clients for further use or storage.

DETAILED DESCRIPTION OF THE INVENTION

Figure 1:
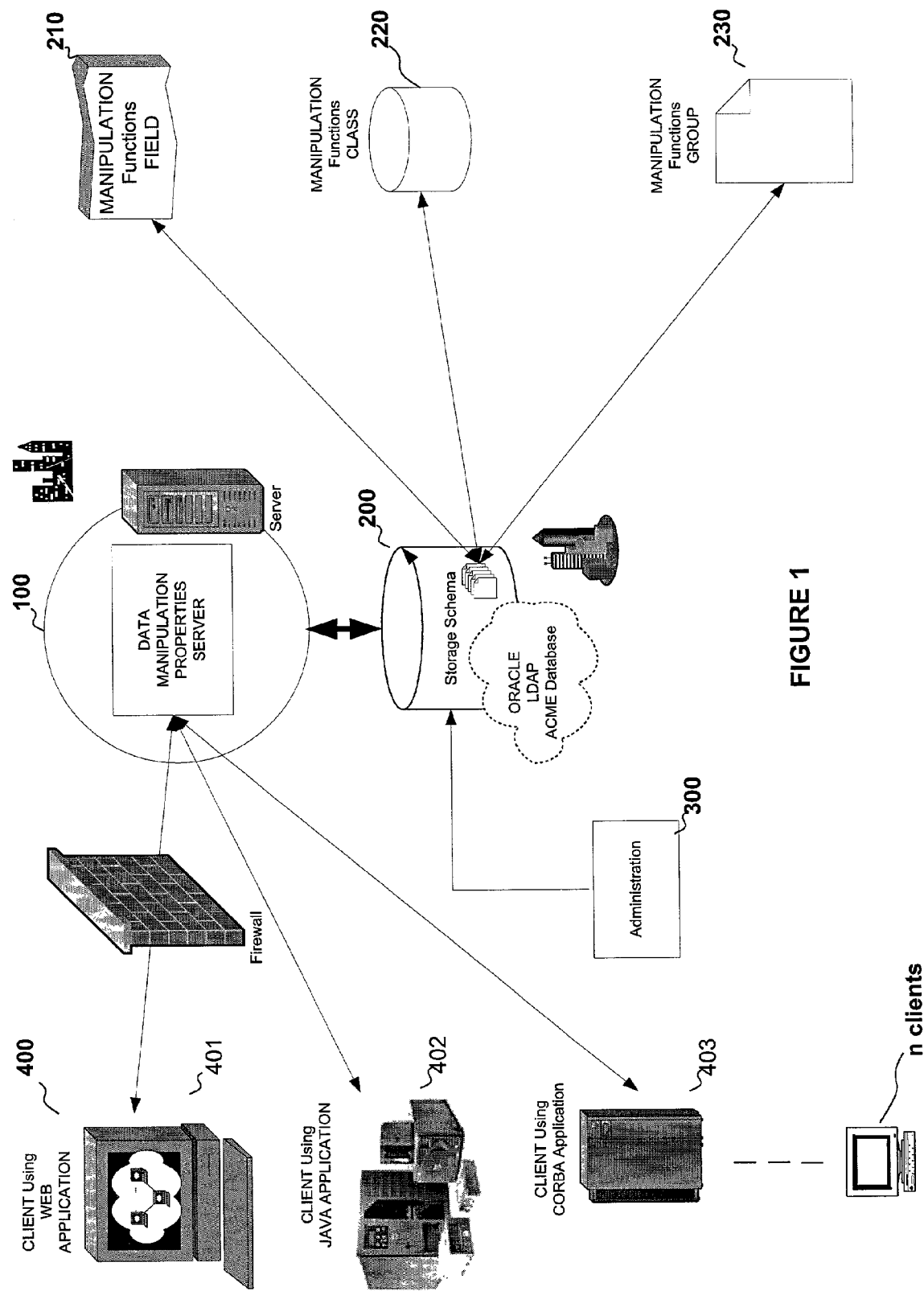
FIG. 1 is a schematic diagram of an overview of the present invention.

As shown in FIG. 1, the present invention preferably includes an application properties server 100 for receiving manipulation requests from clients 400 and a storage mass 200 for storing centralized manipulation functions and data. As will be appreciated by those skilled in the art, manipulation properties application server 100 may be represented by one or more servers, even if located in different geographic locations. In the preferred embodiment of the present invention, depending on system resources, a number n of clients 400 may access the manipulation application server 100 for manipulation service via a number of methods including, for example, clients 401 using Internet applications, clients 402 using Java via a Java RMI server (not shown), clients 403 using CORBA via a CORBA gateway server (not shown), and clients using graphical screen interphase applications.

Figure 2:
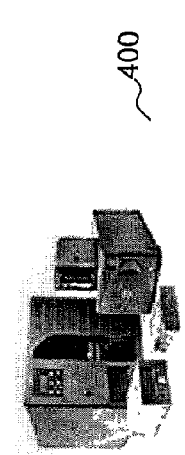
FIG. 2 shows an illustrative example of a specific embodiment of the present invention.
Figure 2:
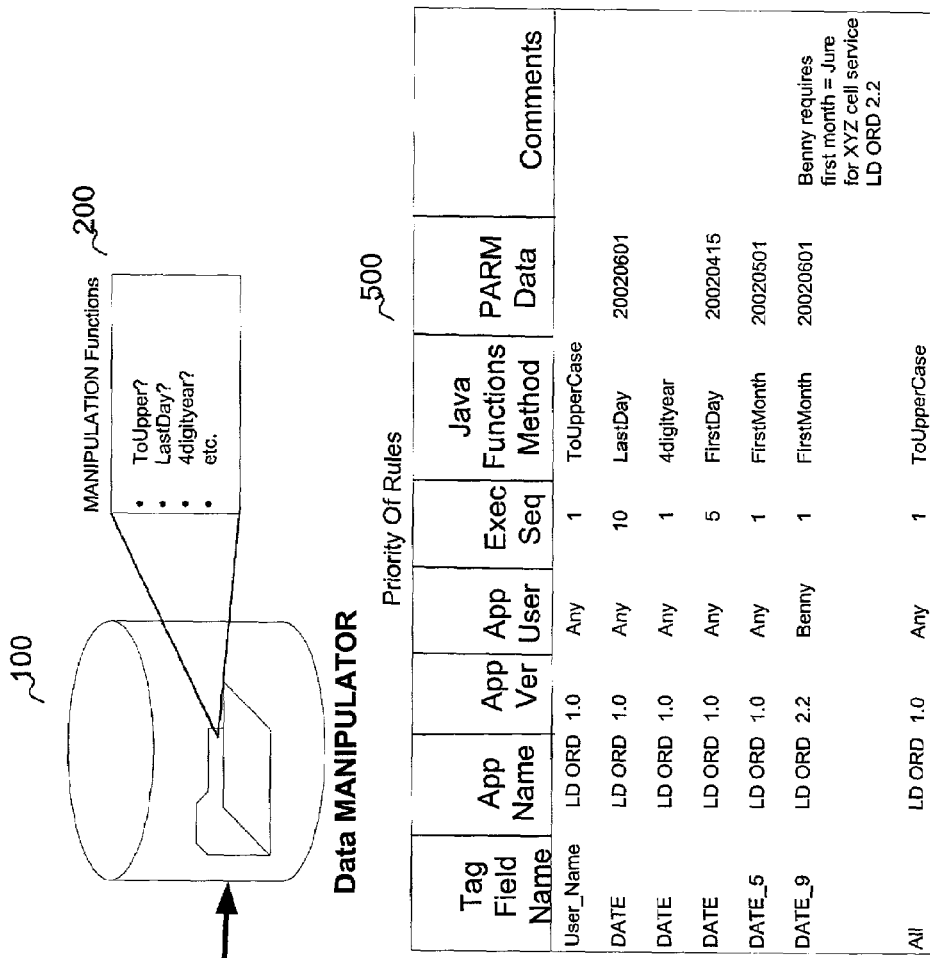

Referring to FIG. 1, according to an embodiment of the present invention, clients send manipulation requests to the application server 100 which then accesses storage mass 200 using a hierarchical rule-based system 500 (FIG. 2). The manipulation application server 100 identifies and accesses the stored data and performs manipulation services associated with the manipulation requests. Preferably tables of manipulation functions, or rules, implement the manipulation data, which may preferably be stored in a storage mass such as an Oracle database. As described hereinbelow, by utilizing a table-based storage system, the application server of the present invention can efficiently and dynamically perform manipulation services on manipulation requests provided by a number n of clients.

Referring to FIG. 1, client 401 requests manipulated services related to data for, for example, long distance ordering information such as valid installation dates, available installation dates, the allowable number of telephones, etc. Storage mass 200 contains a plurality of data tables 210, 220, 230, . . . that will be described below. In response to client 401's manipulation requests, manipulation properties server 100 provides manipulation services to client 401 by accessing storage mass 200. Similarly, and possibly simultaneously, a client 402 running a Java application program can use RMI via an RMI interface to interact with properties server 100 and manipulation of data based on information stored in storage mass 200. Finally, a third client, running a CORBA application 403 may also request manipulation service on data related to, for example, Wireless Ordering. Again, manipulation properties server 100 accesses storage mass 200 and performs a manipulation service for client 403.

The manipulation data may be stored in a format such as Oracle or a Lightweight Directory Access Protocol ("LDAP"). The information may be stored in another location or may be shared with other businesses. Preferably, manipulation data is stored in a table based system, more preferably in an Oracle database 200. As will be appreciated by those skilled in the art, use of an Oracle database allows for good performance, data integrity, and a wide variety of data management tools to administer the configuration data via an administration system 300. As will also be appreciated by those skilled in the art, Oracle database 200 may be represented by two or more databases located in separate geographical locations.

FIG. 2 depicts a more specific embodiment and example of the present invention, wherein the database 200 consists of a table-based system of rules organized into three hierarchically-organized views: FIELD, CLASS and GLOBAL. The three views allow a hierarchical management of the manipulations to be performed on data fields received from the client server 400. In the preferred embodiment, the three views are FIELD, CLASS and GLOBAL in order of precedence. Of course, the number of views may vary depending on the client's needs. Other embodiments of the present invention include four or more views.

Each of the FIELD, CLASS and GLOBAL views has an execution sequence. Utilizing an execution sequence provides a layered approach, and thereby a hierarchical approach to performing manipulation requests, and yields efficient results in this embodiment. According to the execution sequence for a particular view, several manipulation methods can be orderly executed on data for a matching field.

Before providing a specific example, the FIELD, CLASS and GLOBAL views are explained below. In the preferred embodiment, the FIELD view is the highest priority manipulation. Preferably, for efficiency reasons, the least amount of data is sorted by the FIELD view. If a FIELD name for the associated application is in this table that entry will dictate the manipulations to be performed.

As an example of one embodiment of the present invention, referring to Table 1, the FIELD view contains the following data:

TABLE 1

| Column Name | Description |
| --- | --- |
| Tag Name | Name of data field used to locate manipulations |
| Application Name | Application tag to differentiate field names from those in other applications. |
| Application Version | Application tag to differentiate field names from those in other versions of the same application. |
| Application User | Application tag to differentiate field names from those in other instances of an application and version for different users. |

TABLE 1-continued

| Column Name | Description |
| --- | --- |
| Execution Sequence | A number designating the order of execution for the 1 or more manipulation methods for an item meeting the previous criteria. |
| Manipulation Method | The name of an existing Java method to be called with the value of the field to be manipulated. |
| Manipulation Values ("PARM Data") | Used by the manipulation method to compare to the data value. Presence determined by manipulation method. Items are separated by a pre-defined character (generally a ",") (e.g., 1, 5; 20020901, 20020601) |
| Comment | Description of desired rule. Used for documentation only. |

In the preferred embodiment, the CLASS view is the second-highest priority manipulation. The CLASS view is used if there is no matching entry in the FIELD view. In such a case, the manipulation application server 100 will perform a lookup on the passed field name. The manipulation application server 100 will check for class names that match the first part of the field name. An illustrative example is discussed below to describe the FIELD and CLASS view hierarchy.

EXAMPLE 1

No Addresss_1.Data. A client application server 400 accesses the manipulation application server 100 with the field name of Address_1. However, the user has actually input no Address_1 data. Thus, there is no Address_1 item in the FIELD view. There is, however, an entry in the class view for Address. Therefore the manipulation functions for the class Address will be performed on the data in Address_1.

As an example of one embodiment of the present invention, referring to Table 2, the CLASS view contains the following data:

TABLE 2

| Column Name | Description |
| --- | --- |
| Tag Name | A generic string that will be used to match the field's name up to a defined character. (Date_1 will match up with Date) |
| Application Name | Application tag to differentiate field names from those in other applications. |
| Application Version | Application tag to differentiate field names from those in other versions of the same application. |
| Application User | Application tag to differentiate field names from those in other instances of an application and version for different users. |
| Execution Sequence | A number designating the order of execution for the 1 or more manipulation methods for an item meeting the previous criteria. |
| Manipulation Method | The name of an existing Java method to be called with the value of the field to be manipulated. |
| Manipulation Value 1 ("PARM Data") | Used by the manipulation method to compare to the data value. Presence determined by manipulation method. Items are separated by a pre-defined character (generally a ",") |
| Comment | Description of desired rule. Used for documentation only. |

Finally, in the preferred embodiment, the GLOBAL view is the most generic method of performing manipulation functions. Any field that does not have an entry in either the FIELD or CLASS view will be manipulated with the methods dictated for the associated application information. As this view is generic, preferably the most data is handled at the GLOBAL level, thereby improving efficiency. Examples are now discussed below describing the hierarchy between the FIELD, CLASS and GLOBAL views.

EXAMPLE 2

The field name is Residence_2. There is no Residence_2 item in the FIELD view. There is no Residence entry in the CLASS view. There is, however, a GLOBAL manipulation function called toUpper in the GLOBAL table for the application 400 (name, version and user) that requires data manipulation. Therefore, in this example, the data for Residence_2 will be converted to all uppercase letters and manipulation properties server 100 will provide an appropriate return to client 400.

In the preferred embodiment, each of the FIELD, CLASS and GLOBAL views has an execution sequence for the associated manipulation functions that exist for that view. This provides a layered approach to manipulation. An example for describing the execution sequence is described below.

EXAMPLE 3

Field Name: Date 1.

Referring to the illustrative table below, in this illustrative example there is no match for Field Name: Date_1 in the FIELD view. However, there are manipulation executions in the FIELD view table for LastDay, 4digitYear and FirstDay. The manipulation properties server 100 recognizes that the CLASS view table has a matching item called Date. An example of the CLASS view table is as follows:

| Tag Name | Application Name | Application Version | Application User | Execution Sequence | Manipulation Method | Manipulation Value 1 | Comment |
|---|---|---|---|---|---|---|---|
| Date | Appl1 | 001 | EMRS1 | 10 | LastDay | Dec. 31, 2002 | |
| Date | Appl1 | 001 | EMRS1 | 1 | 4digitYear | | |
| Date | Appl1 | 001 | EMRS1 | 5 | FirstDay | Jan. 1, 1996 | |

In this exemplary example, based on the Execution Sequence of "1", the date is first converted to a four-digit year (if necessary by manipulation method "4digityear"). Next, based on the next rule, which has an execution sequence of "5", the date data will be converted to Jan. 1, 1996 if it is not prior to that date using the FirstDay method. Next, the date will be converted to Dec. 31, 2002 if it is after that date with the LastDay method based on the Manipulation Value 1 PARM data in the CLASS view table. Finally, the server 100 will return the converted data to the requesting client application server 400. As will be appreciated, this is an example illustrating a "CLASS" level manipulation.

The table below illustrates examples of proposed manipulation functions:

FIG. 2 depicts further example manipulations performed by an exemplary embodiment of the present invention. In this embodiment, client application server Long Distance Delivery Ordering ("LD ORD") 400 seeks to manipulate data input by a customer, such as user name, the type of service requested, the date available for service, the date of expiration related to a desired telephone service, etc. Accordingly, using a known software application protocol, application server LD ORD 400 sends manipulation requests related to the data input by a customer to the manipulation application server 100. As a first example, the user's name is tag named "User_Name" and has been input as "John Doe". The server 100 notes that the application LD ORD, version 1.0, has generated a request for service. Accordingly, the manipulation application server 100 generates an instruction to call the FIELD view table from the storage medium 200 for User_Name. In this example, the application server 100 automatically follows the priority of rules stored and dynamically maintained in the database 500. Here, there is only one rule, i.e., one Java Function, for User_Name, which is applicable to any user of LD ORD, version 1.0. As shown in FIG. 2, the Java method associated with User_Name rule is ToUpperCase method. Accordingly, the manipulation server 100 checks to see if the input data is all uppercase while also checking for PARM data. Here, if the input data is not all uppercase, the manipulation server 100 converts the data to all uppercase for client 400 and provides an appropriate return to client 400. Of course, if the input data is all uppercase the manipulation server 100 returns an appropriate response to client 400.

Next, according to the example depicted in FIG. 2, the manipulation server 100 performs manipulation service on manipulation requests for data input by a user for date of service, which has been tagged DATE_Serv. Here, database 200 presently has no FIELD view rules for any users of LD ORD, version 1.0, data tagged DATE_Serv. However, in the preferred embodiment, the manipulation server 100 will automatically perform two of three available Java-based CLASS view functions, based on the PARM data and execution sequence of the three presently available CLASS view rules, on the data tagged DATE_Serv, thereby converting the input data 04/01/02 to 20020415. First, the server performs a 4digityear function, and then the server performs a FirstDay function. In this example, the function LastDay

| Return Type | Function Name | Argument 1 | Argument 2 | Argument 3 | Argument 4 |
|---|---|---|---|---|---|
| Boolean | ManipulateIntegerField | String Field Name | Integer Field Data | Integer Min Value | Integer Max Value |
| Boolean | ManipulateStringField | String Field Name | String Field Data | | Integer Max Value |
| Boolean | ManipulateDateRangeField | String Field Name | String Field Data | Earliest Date | Latest Date | is not performed because the PARM data is past the input date. Here again, server 100 provides an appropriate response to client 400. As shown in FIG. 2, the application server 100 will read the execution sequences to determine which Java function to perform first. Java function 4digityear has an execution sequence of "1" and Java function FirstDay has an execution sequence of "5". Based on this sequence of execution set forth in this CLASS view, the manipulation server 100 executes first the 4digityear function and then the FirstDay function on the data. As will be appreciated by those skilled in the art, in this example, if there were no DATE rules, manipulation application server 100 would automatically look for GLOBAL rules in the GLOBAL-view table. Of course, in other embodiments, the server 100 could prompt the user for additional information or generate prompts between class levels. In other embodiments, further services may be provided in response to manipulated data being returned to the client, such as additional data manipulations, generation of further functions, etc. In one embodiment, the manipulated data is displayed on a user's screen for approval before further processing.

Referring again to FIG. 2, next, LD ORD 400 requests manipulation service on data related to the date of availability for a requested telephone service. This data has been tagged DATE_5. The priority of rules 500 indicates that presently there is one rule in the FIELD view, i.e., there is one manipulation function, for DATE_5. Therefore, the manipulation application server 100 performs a FirstMonth function on the data tagged DATE_5.

As shown in FIG. 2, in some instances, server 100 will have rules for specific users of specific versions of application LD ORD. Additionally, database 200 may contain various GLOBAL methods (e.g., ALL) data used by any user of LD ORD. As will be appreciated, the server 100 provides great flexibility for dynamically providing many manipulation functions for a plurality of clients.

As will also be appreciated, by utilizing a centrally located storage system of dynamically maintainable manipulation rules, the present invention provides greater flexibility than known systems. For example, in the exemplary example discussed above system administration 300 (FIG. 1) can change the PARM data for DATE_5 and, accordingly, all applications 400 requesting manipulation services for data related to DATE_5 are contemporaneously updated.

In some instances, the number of manipulation requests may be large depending on the number n of application clients 400 using the server 100. Constant database 200 reads may cause delays in manipulation service. Therefore, in one exemplary embodiment, the manipulation server 100 will read the database 200 data 500 into memory on startup. Updates to the manipulation rules and values stored in the data tables can occur after system start up.

Two exemplary methods to handle dynamic table updates are described below. The first method is to restart the manipulation application server 100 each night during a maintenance window. This approach is a simple restart of the manipulation server. The application itself would not have to restart since it could detect the lost connection to the manipulation server and reconnect. This would be seamless to the applications and end user of the applications. Another exemplary method involves creating a refresh function in the manipulation server 100. Preferably the server 100 will use a REFRESH_HOURS parameter. The memory tables will be updated from the database 200 based on this parameter. Preferably, the REFRESH_HOURS will be greater than 8.

As will be appreciated, keeping the data 500 in the application server 100 memory will improve manipulation performance and allow or maintaining the dynamic nature of the manipulation routines.

The most generic field type in Java is the string. In the preferred embodiment, all data passed to the manipulation server 100 will be treated as a string. This will allow applications 400 to change to more generic data without impact. This embodiment will provide an interface that is generic as possible by establishing the interface as Strings (ASCII). An example of this concept is set forth below.

For example, originally a business requirement required a date value for a Date of Birth variable. The requirement for the legacy system required the date with a two-digit year. The value of the field data from the data source is "02/31/02." However, testing with the legacy system shows that the legacy system actually needs a four-digit year. Because the application is using the manipulator server 100, a code change is avoided. Since the integer values can be type cast to String and passed to the manipulation server 100, modifications to the rules can be made quickly. Modifications to types would cause the manipulation server 100 to understand application knowledge and not data values and manipulation rules. Here, the manipulation method can be changed from 2digityear to 4digityear. Accordingly, the output dates will now have the correct format for the legacy application.

According to the present invention, since the variable is stored as a string, the client code is not affected. Changes to manipulation functions may be done without disturbing the running applications that utilize this manipulation service.

Proposed ManipulatorClient CLASS methods include:

TABLE 3

| Method | Return Type | Arguments | Description |
| --- | --- | --- | --- |
| Manipulator-Client | Manipulator-Client | Application Name, Application Version, Application User | Class constructor. Also used to initialize Application data for subsequent calls |
| Manipulator-Client | Manipulator-Client | | Class constructor. |
| Manipulator-Client | Manipulator-Client | | Class destructor |
| set | | Application Name, Application Version, Application User | Sets application data settings for the object. |
| translate | Boolean | Field Name, Field Value | Sends data to the manipulator server for work. If the data is successfully translated, a TRUE is returned. Otherwise; a FALSE is returned. |
| translate | MRHashTable | FMHashTable | Sends data to the manipulator server for work. If the data is successfully translated, a TRUE is returned. Otherwise; a FALSE is returned. |
| RuleType | Integer | Field Name | Gets the rule type used for manipulation – 0 = None, 1 = Field, 2 = Class, 3 = Global {Used primarily for development} |

In one embodiment, the client servers 400 can minimize network traffic using Field Value Hashtables. As will be appreciated, this will reduce the number of transactions to the manipulation application server 100 and improve performance. One call to the server 100 can contain an entire set of data in need of manipulation. The individual manipulation statuses will also be returned in a Hashtable. Preferably, the IsValid method is used to determine if all the data passed manipulation. If not, individual methods can be checked to determine problem areas.

Proposed FMHashTable CLASS methods include:

TABLE 4

| Method | Return Type | Arguments | Description |
| --- | --- | --- | --- |
| FMHashTable | FMHashTable | | Constructor for a Field Value HashTable object. |
| AddToSet | Boolean | Field Name, Field Value | Add a field value pair to the FVHashTable. Return True on success. |
| RemoveFromSet | Boolean | Field Name | Remove a field value pair from the FVHashTable. Return True on success. |
| MemberValue | String | Field Name | Return the value of the specified key. |

Proposed MRHashTable CLASS methods:

TABLE 5

| Method | Return Type | Arguments | Description |
| --- | --- | --- | --- |
| MRHashTable | MRHashTable | | Constructor for a Manipulator Return HashTable object. |
| AddToSet | Boolean | String Field Name, Boolean Valid | Add a field value pair to the MRHashTable. Return True on success. |
| RemoveFromSet | Boolean | String Field Name, | Remove a field value pair from the MRHashTable. Return True on success. |
| MemberValue | Boolean | Field Name | Return the manipulation status value of the specified key. |
| IsValid | Boolean | | Returns a True if all values for the set are True. Otherwise; returns a False. |

As will be appreciated, according to the embodiments discussed above, two devices that are coupled can engage in direct communications, in indirect communications or a combination thereof. Embodiments of the present invention relate to data communications via one or more networks. The data communications can be carried by one or more communications channels of the one or more networks. Examples of a network include a Wide Area Network (WAN), a Local Area Network (LAN), the Internet, a wireless network, a wired network, a connection-oriented network, a packet network, an Internet Protocol (IP) network, or a combination thereof. A network can include wired communication links (e.g., coaxial cable, copper wires, optical fibers, and so on), wireless communication links (e.g., satellite communication links, terrestrial wireless communication links, wireless LANs, and so on), or a combination thereof.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with the embodiments of the present invention disclosed herein can advantageously allow for efficient hierarchical management of manipulation requests to be performed on data fields. In accordance with the present invention, centrally stored manipulation functions can be manipulated as the customer desires or manipulation constraints change. Application administrators can update or change manipulation methods done on field data without a new release of code. By implementing changes to manipulation methods in the server paradigm, one change is effective for all server clients.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A client-server computer system comprising:
at least one client application server that utilizes data in a form other than an initial form and generates a manipulation request for manipulation of the data from the initial form wherein the request includes the data to be manipulated in the initial form, and wherein the data to be manipulated comprises long distance ordering information including at least one of valid installation dates, available installation dates, and an allowable number of telephones;

an application server accessible by a plurality of client application servers via a plurality of application software protocols, wherein said application server provides a data manipulation service on the data received from the client application server in response to receiving the manipulation request from the client application server, wherein the data manipulation service causes a change to the data to the form other than the initial form and returns the changed data to the same client application server that requested the manipulation, and wherein the data manipulation includes changing characters of a portion of the data from one case to another case and changing a date within a portion of the data from a year representation of a first set of digits to a year representation of a second set of digits; and a storage mass coupled to said application server for storing a system of dynamically maintainable manipulation functions for performing said manipulation service, wherein said storage mass comprises a database, wherein said database contains a table-based system of rules organized into at least three hierarchically organized views, and wherein a least amount of the data is sorted by a first view and wherein most of the data is handled by a third view, thereby improving efficiency in performing the manipulation functions.

2. A client-server computer system according to claim 1, wherein said manipulation functions are represented by a storage schema in the form of Lightweight Directory Access Protocol.

3. A client-server computer system according to claim 2, wherein the storage schema represented by Lightweight Directory Access Protocol represents a table-based system of rules organized into at least three hierarchically-organized views.

4. A client-server computer system according to claim 1, wherein said database stores manipulation functions stored as hierarchically-organized views that are dynamically updatable by an external administrator.

5. A client-server computer system according to claim 2, wherein said storage schema in the form of Lightweight Directory Access Protocol represents manipulation functions stored as hierarchically-organized views that are dynamically updatable by an external administrator.

6. A client-server computer system according to claim 1, wherein said application server and said database are centrally located to said plurality of client application servers and said manipulation functions are maintainable by a remote administrator.

7. A client-server computer system according to claim 3, wherein said application server and said storage schema in the form of Lightweight Directory Access Protocol are centrally located to said plurality of client application servers and said manipulation functions are maintainable by a remote administrator.

8. An application server comprising:

a plurality of client application servers, each client application server utilizing data in a form other than an initial form that the data is in and generating requests for manipulation of the data to the form other than the initial form wherein the requests include the data to be manipulated in the initial form and wherein the data to be manipulated comprises long distance ordering information including at least one of valid installation dates, available installation dates, and an allowable number of telephones;

means for performing manipulation services in response to manipulation requests from said plurality of client application servers where each client application generates a separate request, said means for performing manipulation services being coupled to said plurality of client application servers and the means for performing the manipulation services causing a change to the data that is received from each client application server to the form other than the initial form and returning the changed data to the same client application server that requested the manipulation; and means for storing and dynamically maintaining a hierarchically-organized system of a table-based system of manipulation rules coupled to said means for performing manipulation services wherein the manipulation rules are implemented by the means for performing manipulation services in order to change the data prior to returning it to each client application server, wherein said means for storing manipulation rules comprises a database, wherein said database contains a table-based system of rules organized into at least three hierarchically-organized views, and wherein a least amount of the data is sorted by a first view and wherein most of the data is handled by a third view, thereby improving efficiency in performing the manipulation functions.

9. A client-server computer system according to claim 8, wherein said manipulation rules are stored in a schema in the form of Lightweight Directory Access Protocol.

10. A client-server computer system according to claim 9, wherein said schema in the form of Lightweight Directory Access Protocol represents a table-based system of rules organized into at least three hierarchically-organized views.

11. A client-server computer system according to claim 8, wherein said database stores manipulation functions stored as hierarchically-organized views that are dynamically updatable by an external administrator.

12. A client-server computer system according to claim 9, wherein said storage schema in the form of Lightweight Directory Access Protocol represents manipulation functions stored as hierarchically-organized views that are dynamically updatable by an external administrator.

13. A client-server computer system according to claim 8, wherein said means for performing manipulation services and said database are remotely located to said plurality of client application sewers and wherein said manipulation rules are maintainable by a remote administrator.

14. A client-server computer system according to claim 10, wherein said application server in the form of Lightweight Directory Access Protocol are remotely located to said plurality of client application servers and further comprises means for maintaining said manipulation functions.

15. A system for providing data manipulation service on based on requests from applications running a plurality of software protocols, the system comprising:

a data network;

an application server, the application server in communication with the data network to receive data within manipulation requests for manipulation of the data and wherein the application server changes the data to a form other than an initial form and returns the changed data to a same application that requested the manipulation in response to the requests, wherein the requests include the data to be manipulated in the initial form, and wherein the data to be manipulated comprises long distance ordering information including at least one of valid installation dates, available installation dates, and an allowable number of telephones;

an application that utilizes the data in the form other than the initial form, the application in communication with the application server, the application providing the manipulation requests and data in the initial form to the application server via the data network and receiving the changed data back from the application server;

one or more open application programming interfaces, the one or more application programming interfaces capable of handling a plurality of software protocols in communication with the application server; and a data schema accessible by said application server in communication with said data network, for storing manipulation functions that are employed by the application server to cause the change to the data prior to returning it to the application, wherein said data schema comprises a database, wherein said database contains a table-based system of rules organized into hierarchically-organized views, and wherein a least amount of the data is sorted by a first view and wherein most of the data is handled by a third view, thereby improving efficiency in performing the manipulation functions.

16. A computer system according to claim 15, wherein said manipulation functions are stored in the format of a Lightweight Directory Access Protocol.

17. A system according to claim 16, wherein said schema in the form of a Lightweight Directory Access Protocol represents a table-based system of rules organized into hierarchically-organized views.

18. A system for providing an application service, the system comprising:

means for receiving a service request from a customer application computer, the customer application computer requesting data that is in an initial form to be manipulated into a form other than the initial form and passing data to said system in the form of hashtables;

means for sending a manipulation request instruction to an application server corresponding to data in the initial form to be manipulated;

means for sending a service request from the application server to a data base, the service response based at least in part on the manipulation request;

means for performing hierarchically-based manipulation services on the data that is in the initial form to cause a change to the data that places the data in the form other than the initial form;

means for remotely updating said database based on current manipulation requirements of said system;

means for sending a manipulation result including the changed data from the application server to the same customer application computer that sent the request for manipulation based at least in part on the manipulation request; and means for providing a response to said system from said customer application computer in response to said manipulation result;

means for storing and dynamically maintaining a hierarchically-organized system of a table-based system of manipulation rules coupled to said means for performing manipulation services wherein the manipulation rules are implemented by the means for performing manipulation services in order to change the data prior to returning it to the application server, wherein said means for storing manipulation rules comprises a database, wherein said database contains a table-based system of rules organized into at least three hierarchically-organized views, and wherein a least amount of the data is sorted by a first view and wherein most of the data is handled by a third view, thereby improving efficiency in performing the manipulation services.

* * * * *